United States Patent
Suggs et al.

(10) Patent No.: US 7,593,948 B2
(45) Date of Patent: Sep. 22, 2009

(54) CONTROL OF SERVICE WORKLOAD MANAGEMENT

(75) Inventors: Darrell Suggs, Raleigh, NC (US); John Scott, Cary, NC (US); Robert L. Fair, Cary, NC (US)

(73) Assignee: Network Appliance, Inc., Sunnyvale, CA (US)

( * ) Notice: Subject to any disclaimer, the term of this patent is extended or adjusted under 35 U.S.C. 154(b) by 423 days.

(21) Appl. No.: 11/166,478

(22) Filed: Jun. 23, 2005

(65) Prior Publication Data

US 2006/0294045 A1 Dec. 28, 2006

(51) Int. Cl.
*G06F 17/30* (2006.01)
(52) U.S. Cl. ................. 707/100; 709/223; 709/217; 709/201; 709/226; 709/218; 707/10; 707/3; 707/104.1; 707/2
(58) Field of Classification Search ............ 707/2, 707/10, 100; 711/211; 709/217–218, 223
See application file for complete search history.

(56) References Cited

U.S. PATENT DOCUMENTS

| 5,276,867 | A | | 1/1994 | Kenley et al. | |
|---|---|---|---|---|---|
| 5,287,500 | A | * | 2/1994 | Stoppani, Jr. | 711/211 |
| 6,263,364 | B1 | * | 7/2001 | Najork et al. | 709/217 |
| 6,408,006 | B1 | * | 6/2002 | Wolff | 370/412 |
| 6,496,515 | B2 | * | 12/2002 | Lefebvre et al. | 370/455 |
| 6,728,897 | B1 | | 4/2004 | Cramer et al. | |
| 6,748,510 | B1 | | 6/2004 | Coatney | |
| 6,757,695 | B1 | | 6/2004 | Noveck et al. | |
| 6,920,505 | B2 | | 7/2005 | Hals et al. | |
| 7,130,891 | B2 | * | 10/2006 | Bernardin et al. | 709/218 |
| 2004/0230675 | A1 | * | 11/2004 | Freimuth et al. | 709/223 |
| 2006/0253621 | A1 | * | 11/2006 | Brewer et al. | 710/40 |

FOREIGN PATENT DOCUMENTS

GB    2 121 995    1/1984

OTHER PUBLICATIONS

Craig S. Mullins, "Architectures for Clustering: Shared Nothing and Shared Disk," DB2magazine, http://www.db2mag.com/db_area/archives/2002/q1/mullins.shtml, Quarter 1, 2002, pp. 1-8.
NETAPP, "Network Appliance—Filers—Clustered Failover High-Availability Solution," http://www.netapp.com/products/software/clustered.html?fmt-print, Copyright 2005, pp. 1-3.

(Continued)

*Primary Examiner*—Don Wong
*Assistant Examiner*—Sheree N Brown
(74) *Attorney, Agent, or Firm*—Blakely, Sokoloff, Taylor & Zafman LLP (57) ABSTRACT

A system and method are provided to manage different types of workload. The method comprises receiving a request, determining a class of the request, determining a priority level associated with the class of the request, and servicing the request utilizing the priority level of the class of the request. The class of the request may be associated with a target volume, as well as with a network protocol, or with a network port.

21 Claims, 4 Drawing Sheets

OTHER PUBLICATIONS

Mokbel M. F. et al., "Scalable Multimedia Disk Scheduling", Data Engineering, 2004. Proceedings, 20th International Conference on Boston, MA Mar. 30-Apr. 2, 2004, Piscataway, NJ, IEEE, Mar. 30, 2004, p. 498-509.

Cuneyt Akinlar et al., "A Scalable Bandwidth Guaranteed Distributed Continuous Media File System Using Network Attached Autonomous Disks", IEEE Transactions on Multimedia, IEEE Service Center, Piscataway, NJ, vol. 5, No. 1, Mar. 2003, p. 71-96.

Aref W. G. et al., "An Inexpensive, Scalable, and Open-Architecture Media Server", Internet Technologies and Services, 1999. Proceedings. First IEEE/Popov Workshop on Oct. 25-28, 1999, Piscataway, NJ, IEEE, Oct. 25, 1999, p. 36-43.

Dimitrijevic Z., Rangaswami, R., "Quality of Service Support for Real-Time Storage Systems", International IPSI-2003, 2003, p. 1-8.

* cited by examiner

CONTROL OF SERVICE WORKLOAD MANAGEMENT

FIELD OF THE INVENTION

At least one embodiment of the present invention pertains to control of service and, more particularly to management of different types of workload.

BACKGROUND

Appliances, such as storage servers, often handle heavy load and overload in a "non-linear" and uncontrolled fashion. When a storage server is operated under a heavy load, performance can rapidly deteriorate, with unexpected interactions between different storage system components.

Traditional concept associated with performance control is Quality of Service (QOS). QOS typically indicates the ability to insure a certain performance level under certain conditions. Providing this type of service level guarantees may require an upgrade of a storage system with additional hardware, which sometimes is not an acceptable approach.

Some existing systems attempt to optimize performance of a storage server automatically to achieve maximum throughput. However, in some complex multi-function environments reduced latency may be valued over throughput, while in other environments it may be the opposite. Where multiple workloads are competing for resources such as CPU utilization or disk access, some workloads (e.g., requests associated with purchase orders database) may be considered as mission critical by a user, while other workloads (e.g., requests associated with employees' home directories) may be considered as capable of tolerating higher latency. Existing systems do not allow prioritizing of a workload with respect to storage system resources based on a class of a workload.

In one embodiment, workload classification may include client work (where a request is initiated by a user) and application work (where workload is initiated by a uniquely addressable requesting entity). A situation may be encountered by storage system users where user-initiated requests (e.g., user operations over protocols such as NFS, CIFS, FCP or iSCSI on a single storage entity) are competing with system-initiated requests (application work) for resources. System-initiated requests include operations performed while generating a snapshot (i.e., an image of the active file system at a point in time, a consistency point CP), or while performing mirror operations, where data are periodically mirrored to other systems (e.g., while performing snapmirror operations). It should be noted that "snapshot" is a trademark of Network Appliance, Inc. and is used for purposes of this patent to designate a persistent consistency point (CP) image. "Snapmirror" is a trademark of Network Appliance, Inc, which is used for purposes of this patent to designate operations, where data are periodically mirrored to other systems. On a busy system, snapmirror or similar system operation may cause an undesirable impact to user operations, either increasing latency or decreasing I/Os per second (IOPS) beyond levels acceptable to the administrator. In some environments, it may be desirable that user-generated requests are disrupted as little as possible during CP or snapmirror operations, while in other environments, users may desire that system-initiated requests are unhindered by user-generated requests. Existing systems do not allow prioritization of user-initiated requests with respect to system-generated requests.

SUMMARY

A system and method are provided to manage different types of workload. The method comprises receiving a request, determining a class of the request, determining a priority level associated with the class of the request, and servicing the request utilizing the priority level of the class of the request. The class of the request may be associated with a target volume, as well as with a network protocol, or with a network port.

Other aspects of the invention will be apparent from the accompanying figures and from the detailed description that follows.

BRIEF DESCRIPTION OF THE DRAWINGS

One or more embodiments of the present invention are illustrated by way of example and not limited to the figures of the accompanying drawings, in which like references indicate similar elements and in which.

DETAILED DESCRIPTION

In one embodiment of the present invention, a method and system are provided to manage workload. The method and system may be collectively referred to as control of service (COS).

Control of service allows storage administrators to assign priority levels to different classes of work (e.g., utilizing a "priority" command). For example, a storage administrator may choose to prioritize one storage entity (e.g., a storage volume comprising physical storage devices defining an overall logical arrangement of storage space) higher than another storage entity or to make requests received over one protocol to be serviced with higher priority than requests received over another protocol. Thus, when there are multiple different classes of work to be serviced, work with the higher priority may gain preferential access to resources.

In one embodiment, prioritization with respect to storage system resources may be available for different volumes, different network protocols, or different communication ports. In one embodiment, control of service allows control over CPU usage, concurrent disk reads, and Non-Volatile Random Access Memory (NVRAM) consumption. A storage administrator may also be permitted to set priority of user-initiated workloads (e.g., operations over protocols such as NFS, CIFS, FCP or iSCSI on a single entity (volume)) relative to system-initiated workloads (e.g., snapmirror) and vise versa.

Figure 1:
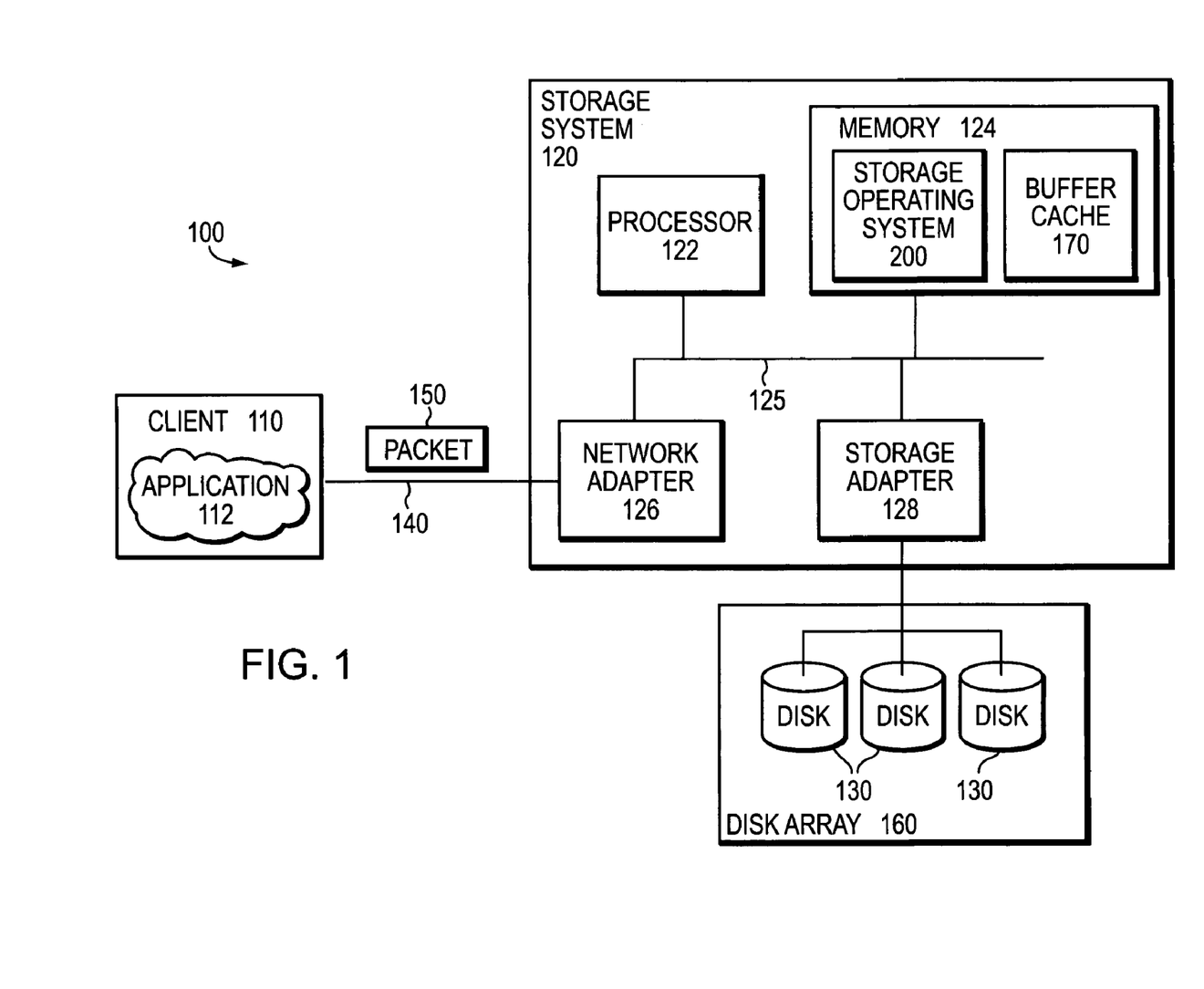
FIG. 1 is a schematic block diagram of an environment including a storage system that may be used with one embodiment of the present invention.

FIG. 1 is a schematic block diagram of an environment 100 including a storage system 120 that may be advantageously used with one embodiment of the present invention. The storage system provides storage service relating to the organization of information on storage devices, such as disks 130 of a disk array 160. The storage system 120 comprises a processor 122, a memory 124, a network adapter 126 and a storage adapter 128 interconnected by a system bus 125. The storage system 120 also includes a storage operating system 200 that preferably implements a high-level module, such as a file system, to logically organize the information as a hierarchical structure of directories, files and special types of files called virtual disks (hereinafter "blocks") on the disks.

In the illustrative embodiment, the memory 124 comprises storage locations that are addressable by the processor and adapters for storing software program code. A portion of the memory may be further organized as a "buffer cache" 170 for storing certain data structures. The processor and adapters may, in turn, comprise processing elements and/or logic circuitry configured to execute the software code and manipulate the data structures. Storage operating system 200, portions of which are typically resident in memory and executed by the processing elements, functionally organizes the system 120 by, inter alia, invoking storage operations executed by the storage system. It will be apparent to those skilled in the art that other processing and memory means, including various computer readable media, may be used for storing and executing program instructions pertaining to the inventive technique described herein.

The network adapter 126 comprises the mechanical, electrical and signaling circuitry needed to connect the storage system 120 to a client 110 over a computer network 140, which may comprise a point-to-point connection or a shared medium, such as a local area network. Illustratively, the computer network 140 may be embodied as an Ethernet network or a Fibre Channel (FC) network. The client 110 may communicate with the storage system over network 140 by exchanging discrete frames or packets of data according to pre-defined protocols, such as the Transmission Control Protocol/Internet Protocol (TCP/IP).

The client 110 may be a general-purpose computer configured to execute applications 112. Moreover, the client 110 may interact with the storage system 120 in accordance with a client/server model of information delivery. That is, the client may request the services of the storage system, and the system may return the results of the services requested by the client by exchanging packets 150 over the network 140. The clients may issue packets including file-based access protocols, such as the Common Internet File System (CIFS) protocol or Network File System (NFS) protocol, over TCP/IP when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

The storage adapter 128 cooperates with the storage operating system 200 executing on the system 120 to access information requested by a user (or client). The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130, such as HDD and/or DASD, of array 160. The storage adapter includes input/output (I/O) interface circuitry that couples to the disks over an I/O interconnect arrangement, such as a conventional high-performance, FC serial link topology.

Storage of information on array 160 may be implemented as one or more storage "volumes" that comprise a collection of physical storage disks 130 cooperating to define an overall logical arrangement of virtual block number (vbn) space on the volume(s). Each logical volume is generally, although not necessarily, associated with its own file system. The disks within a logical volume/file system are typically organized as one or more groups, wherein each group may be operated as a RAID. Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it will be understood that other types and levels of RAID implementations may be used in accordance with the inventive principles described herein.

To facilitate access to the disks 130, the storage operating system 200 implements a write-anywhere file system that cooperates with virtualization modules to "virtualize" the storage space provided by disks 130. The file system logically organizes the information as a hierarchical structure of named directories and files on the disks. Each "on-disk" file may be implemented as a set of disk blocks configured to store information, such as data, whereas the directory may be implemented as a specially formatted file in which names and links to other files and directories are stored. The virtualization modules allow the file system to further logically organize information as a hierarchical structure of blocks on the disks that are exported as named logical unit numbers (LUNs).

Figure 2:
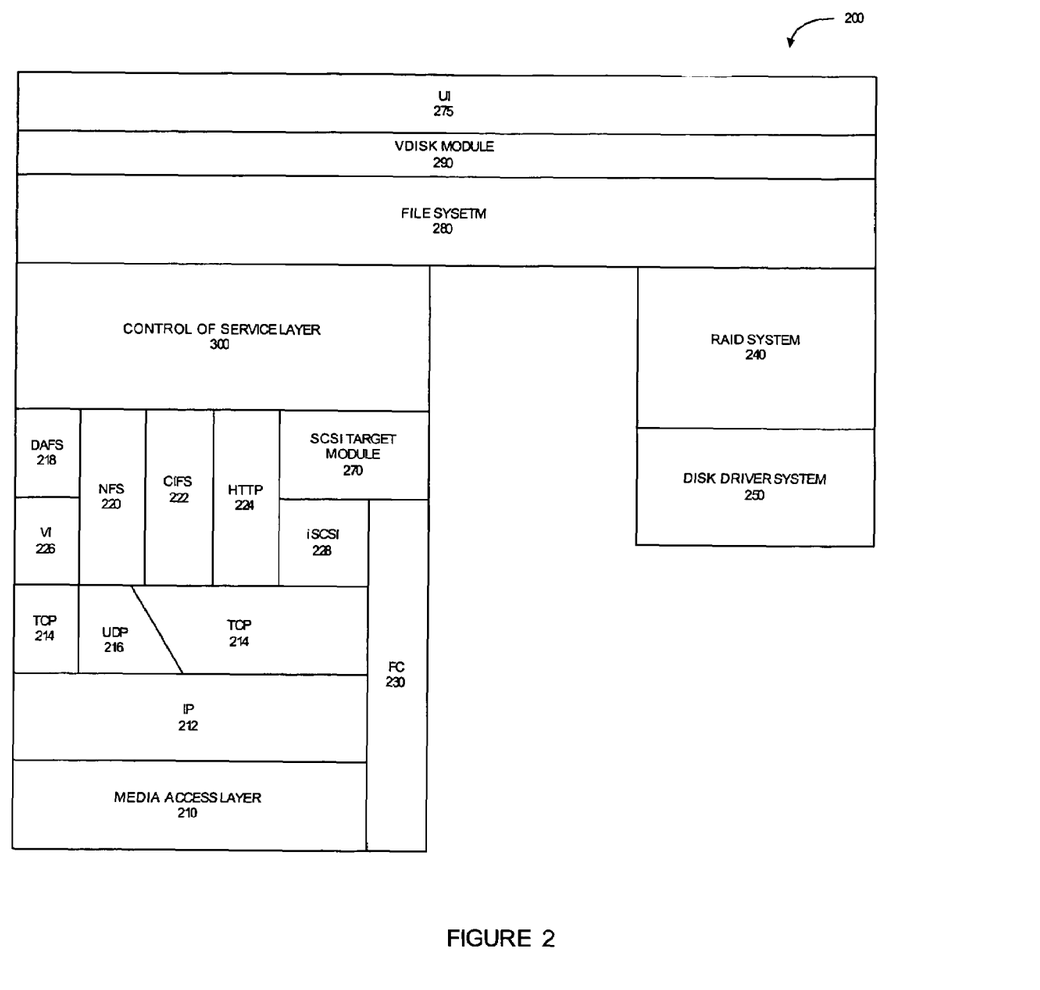
FIG. 2 is a schematic block diagram of a storage operating system that may be used with one embodiment of the present invention.

FIG. 2 is a schematic block diagram of the storage operating system 200 that may be advantageously used with one embodiment of the present invention. The storage operating system comprises a series of software layers organized to form an integrated network protocol stack or, more generally, a multi-protocol engine that provides data paths for clients to access information stored on the storage system using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for the Direct Access File System (DAFS) protocol 218, the NFS protocol 220, the CIFS protocol 222 and the Hypertext Transfer Protocol (HTTP) protocol 224. A virtual interface (VI) layer 226 implements the VI architecture to provide direct access transport (DAT) capabilities, such as remote direct memory access (RDMA), as required by the DAFS protocol 218.

A iSCSI driver layer 228 provides block protocol access over the TCP/IP network protocol layers, while a FC driver layer 230 receives and transmits block access requests and responses to and from the storage system. The FC and iSCSI drivers provide FC-specific and iSCSI-specific access control to the blocks and, thus, manage exports of LUNs to either iSCSI or FCP or, alternatively, to both iSCSI and FCP when accessing the blocks on the storage system. In addition, the storage operating system includes a storage module embodied as a RAID system 240 that manages the storage and retrieval of information to and from the volumes/disks in accordance with I/O operations, and a disk driver system 250 that implements a disk access protocol such as, e.g., the SCSI protocol.

Bridging the disk software layers with the integrated network protocol stack layers is a virtualization system that is implemented by a file system 280 interacting with virtualization modules illustratively embodied as, e.g., vdisk module 290 and SCSI target module 270. The vdisk module 290 is layered on the file system 280 to enable access by administrative interfaces, such as a user interface (UI) 275, in response to a user (system administrator) issuing commands to the storage system. The SCSI target module 270 is disposed to provide a translation layer of the virtualization system between the block (LUN) space and the file system space, where LUNs are represented as blocks. The UI 275 is disposed over the storage operating system in a manner that enables administrative or user access to the various layers and systems.

The file system is illustratively a message-based system that provides logical volume management capabilities for use in access to the information stored on the storage devices, such as disks. That is, in addition to providing file system semantics, the file system 280 provides functions normally associated with a volume manager. These functions include (i) aggregation of the disks, (ii) aggregation of storage bandwidth of the disks, and (iii) reliability guarantees, such as mirroring and/or parity (RAID). The file system 280 illustratively implements a write anywhere file system having an on-disk format representation that is block-based using, e.g., 4 kilobyte (kB) blocks and using index nodes ("inodes") to identify files and file attributes (such as creation time, access permissions, size and block location). The file system uses files to store metadata describing the layout of its file system; these metadata files include, among others, an inode file. A file handle, i.e., an identifier that includes an inode number, is used to retrieve an inode from disk.

Bridging the file system 280 with the integrated network protocol stack layers is a control of service layer (COS layer), which is disposed such that it may interface with the file system to select, prioritize, and meter incoming messages (work) that enter the file system 280. In one embodiment, control is enforced by gating entry into the file system 280 and metering how much work is pending in the file system 280.

In one embodiment of the present invention, a file system message is schedulable if it is a candidate for COS priority scheduling. Such a message is queued on a COS priority queue, and then is subsequently scheduled for running based on the user's COS policy in effect. The workload management functionality may be implemented, in one embodiment, by intercepting incoming messages at the COS layer and redirecting schedulable messages into COS queues for prioritization. If a message cannot be scheduled, then the message is directly executed, and the result returned as with normal file system message processing.

Schedulable messages may be explicitly identified as schedulable or non-schedulable. Schedulable messages may include file system read and write messages. Non-schedulable messages may include signals and consistency point messages.

It will be understood by those skilled in the art that the inventive technique described herein may apply to any type of special-purpose (e.g., file server, filer or multi-protocol storage appliance) or general-purpose computer, including a standalone computer or portion thereof, embodied as or including a storage system 120. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 3:
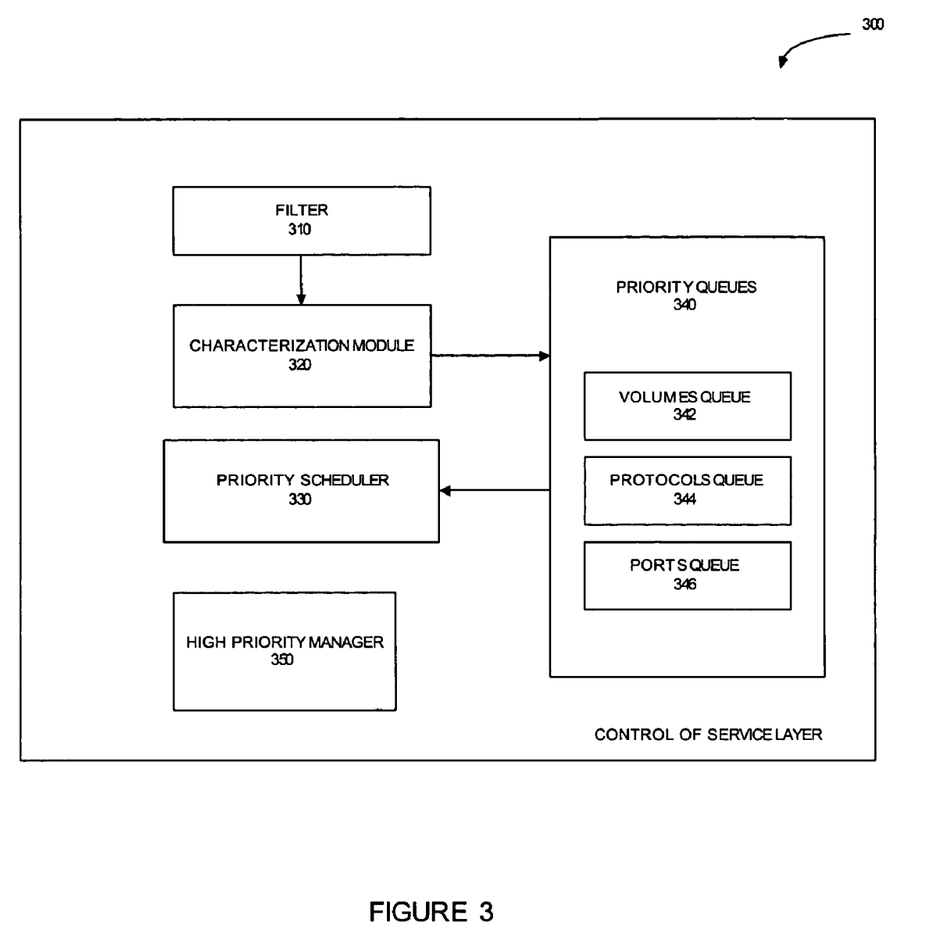
FIG. 3 is a schematic block diagram of a control of service layer, according to one embodiment of the present invention.

FIG. 3 is a schematic block diagram of a COS layer 300, according to one embodiment of the present invention. The COS layer 300 includes a filter 310, a characterization module 320, a priority scheduler 330, priority queues 340, and a high priority manager 350. In one embodiment, when a message (a request) arrives at the COS layer, the filter 310 determines whether the priority service is turned off for the target volume associated with the message, and, if the priority service is off, the message is permitted to proceed without COS checking any of the scheduling settings. Otherwise, the message is processed as described further below.

The high priority manager 350 is utilized to perform time-critical operations that might not be responded to normally by the priority scheduler 330. Such time-critical operations may include, for example, COS reconfiguration/reload messages, receipt and queuing of indirect file system messages. Other time-critical operations may include detecting and managing conditions where other load may delay processing of COS queued messages.

Messages intercepted at the COS layer 300 are often associated with storage volumes. A storage volume, for which the priority service has been turned on, may be referred to as a scheduled volume. Conversely, a storage volume, for which the priority service is off, may be referred to as a non-scheduled volume. In one embodiment, in a busy system with scheduled and non-scheduled volumes, the non-scheduled volumes can consume resources as if no control of service was in effect. However, traffic associated with the scheduled volumes will be forced to adhere to the scheduling rules. In one embodiment, it may result in CPU scheduling always selecting non-scheduled work when it is present, non scheduled volume requests having unlimited disk reads in flight (outstanding disk reads), and non scheduled volume requests being permitted to consume all of NVRAM if needed.

In an alternative embodiment, a "default" schedule is used for all messages with volumes that are not associated with a specific COS priority schedule. This schedule may have properties similar to the volume specific priority properties (e.g., relative priority, user vs. system priority etc.).

Characterization module 320 receives scheduled messages from the filter 310 and determines the class of workload associated with the request (the class of the request). Some classes of workload may include particular volumes or particular types of volumes. For example, one class of workload may comprise requests associated with traditional volumes, while another class of workload may comprise requests associated with flexible volumes (volumes where the file system layout flexibly allocates an underlying physical volume into one or more virtual volumes of a storage system). The scheduled message is then queued for processing in the priority queues 340. The scheduled messages may be queued either directly or indirectly. Direct queuing places the message on the appropriate priority queue, then signals the priority scheduler 330 that work is available. Indirect queuing occurs by forwarding the message to the high priority manager 350. The use of the high priority manager 350 allows messages to be queued in a timely fashion in a busy system.

In one embodiment, the priority scheduler 350 performs qualified scheduling of file system messages. Qualified scheduling of file system messages for execution may occur when messages with different characteristics (e.g., messages associated with volumes designated as having different priority levels) are present. The priority scheduler 350 may operate in two modes. In one mode, the priority scheduler 350 actively loops, dequeues qualified messages from the priority queues, and executes the qualified messages. In another mode, the priority scheduler 350 waits for work until it receives a wakeup signal, which, in one embodiment, occurs when a new message is added to one of the queues in the priority queues 340.

The COS layer may be configured to keep a count of the number of messages currently queued in the priority queues 340 for dispatch. In one embodiment, if the count exceeds a predetermined high-water mark, this indicates that the control of service mechanism may not be able to keep up with the current rate of incoming messages or that a higher priority activity is preventing the priority scheduler 340 from running in a timely fashion. This situation may be referred to as a burst. In order to handle a burst, whenever a new file system message is enqueued into a COS queue, a check is performed to determine whether the predetermined high-water limit has been exceeded. If the high-water limit has been exceeded, messages may be directly dequeued from COS layer 300 and executed until a low-water mark is achieved. When the high-water limit is exceeded, processing is temporarily switched to be handled by COS high priority processes that may be handled by the high priority manager 350. In an alternative embodiment, when the high-water limit is exceeded, the messages are handled as if the control of service mechanism is disabled.

Because COS layer 300 manages a large subset of file system messages, a situation may occur where a consistent non-schedulable load is passing through the file system preventing messages queued in the priority queues 340 from proceeding to the priority scheduler 330. This condition may be referred to as an inversion. An inversion may be manifested by a scheduled operation waiting an excessive amount of time for completion. Examples of conditions that can generate inversions include a sustained load of non-schedulable messages or a sustained load of non-schedulable messages that are being handled excessively by the high priority manager 350. Inversions may be handled by detecting messages that are not schedulable, and making them schedulable where possible.

In one embodiment COS layer may include a plurality of queues such as priority queues 340. There may be a queue implemented for each distinct class of workload. The priority queues 340 may include a traditional volumes queue 342 to handle requests associated with traditional volumes, a flexible volumes queue 344 to handle requests associated with flexible volumes, and a default queue 346 to handle scheduled requests that do not belong to any other existing workload class. In some embodiments, where workload is being prioritized based on a network protocol associated with the message or on a communication port associated with the message, the priority queues 340 may include a protocols queue or a ports queue. One of the priority properties for each queue is a weight for the queue relative to other queues. The weight of a queue, in one embodiment, is based on the user-specified priority settings for the class of workload associated with the queue. The characterization module 320 may be utilized to place a scheduled message into the appropriate queue.

Each queue structure may contain several types of information such as selection information used when selecting which queue to use, policy information to determine the policy to apply for that queue, lists of messages currently suspended on that queue, as well as various statistics.

Once the correct queue has been identified, the message is placed on one of the queue message lists. In one embodiment, each queue comprises two lists: one for system-initiated messages and one for user-initiated messages. A message may be identified as a user-initiated message if, for example, the message is associated with one of the user protocols (e.g., NFS, CIFS, ISCSI, or FCP). A message that is not associated with any one of the user protocols may be considered to be a system-initiated message and therefore placed in the system message list.

Messages are removed from a queue and dispatched by the priority scheduler 330 when it is appropriate to dispatch a message. A queue from the priority queues 340 may be chosen based on relative priorities of the classes of workloads associated with each queue as well as utilizing various fairness mechanisms (e.g., a modified Monte Carlo random selection). The determination of whether a user-initiated or a system-initiated message is to be dispatched from a queue for execution may be based on the relative priorities of system-initiated messages and user-initiated messages (e.g., utilizing system/user weight property for the selected queue), and on a random number used to determine which message to dequeue.

In one embodiment, some of the values associated with priority settings for a volume include the following:
  Priority Service: on/off (default: off)
  Relative Priority: very_high, high, medium, low, very_low (default: medium)
  User Priority (relative to system priority): very_high, high, medium, low, very_low (default: medium, where user-initiated requests are treated with the same priority as system-initiated requests)

Priority settings may be translated into a table of values for each resource controlled (e.g., CPU, disk reads, and NVRAM), as shown in Table 1.

TABLE 1

| Volume | User CPU | User Disk | User NVRAM | System CPU | System Disk |
| --- | --- | --- | --- | --- | --- |
| vol0 | 40% | 200 | 30% | 20% | 20 |
| vol1 | 40% | 200 | 50% | 20% | 20 |
| vol2 | 20% | 200 | 50% | 80% | 100 |

In one embodiment, the User CPU column must sum up to 100%. User CPU, User NVRAM, and System CPU are percentages between 0% and 100%. User Disk and System Disk range from 1 to a maximum permitted number of disk reads for the volume. Oversubscription may be indicated by the sum of the User NVRAM column values greater than more than 100. In one embodiment, System CPU value indicates that a user has access to 1—System CPU % of CPU. For example, for vol0, where the System CPU value is 20%, a user has access to 80% of CPU. The total sum of the User Disk column represents a system wide limit on reads in flight.

The construction of the control table values, in one embodiment, is based on the predetermined values for Relative Priority and User vs System value. For example, the basic settings may be translated into numeric values as follows:
  Very_High=100
  High=80
  Medium=60
  Low=40
  Very_Low=20

In one embodiment, COS layer 300 is configured to implement I/O suspend throttling. When a file system message is suspended or resumed, the COS layer 300 is notified by a call to an COS suspend count function. This function locates the COS priority queue associated with the message, and updates the count for suspended messages for that queue. Separate counts are kept for user and system messages. These counts may then be used when it is time to schedule a message for execution. If the suspend limit for a particular queue has been reached, then a message will not be chosen from that queue. The suspend limit may be based, for example, on the number of disk operations that can be associated with each priority queue.

In one embodiment, COS layer 300 is configured to implement NVLOG throttling in order to limit disk write bandwidth during operations associated with consistency points. In one embodiment, NVLOG throttling operates only during CPs, and acts by counting the amount of NVRAM consumed by messages associated with specific volumes. If an NVRAM entry that is about to be written would exceed the percentage of NVRAM allowed for the volume, the associated message is suspended until the end of the consistency point.

Figure 4:
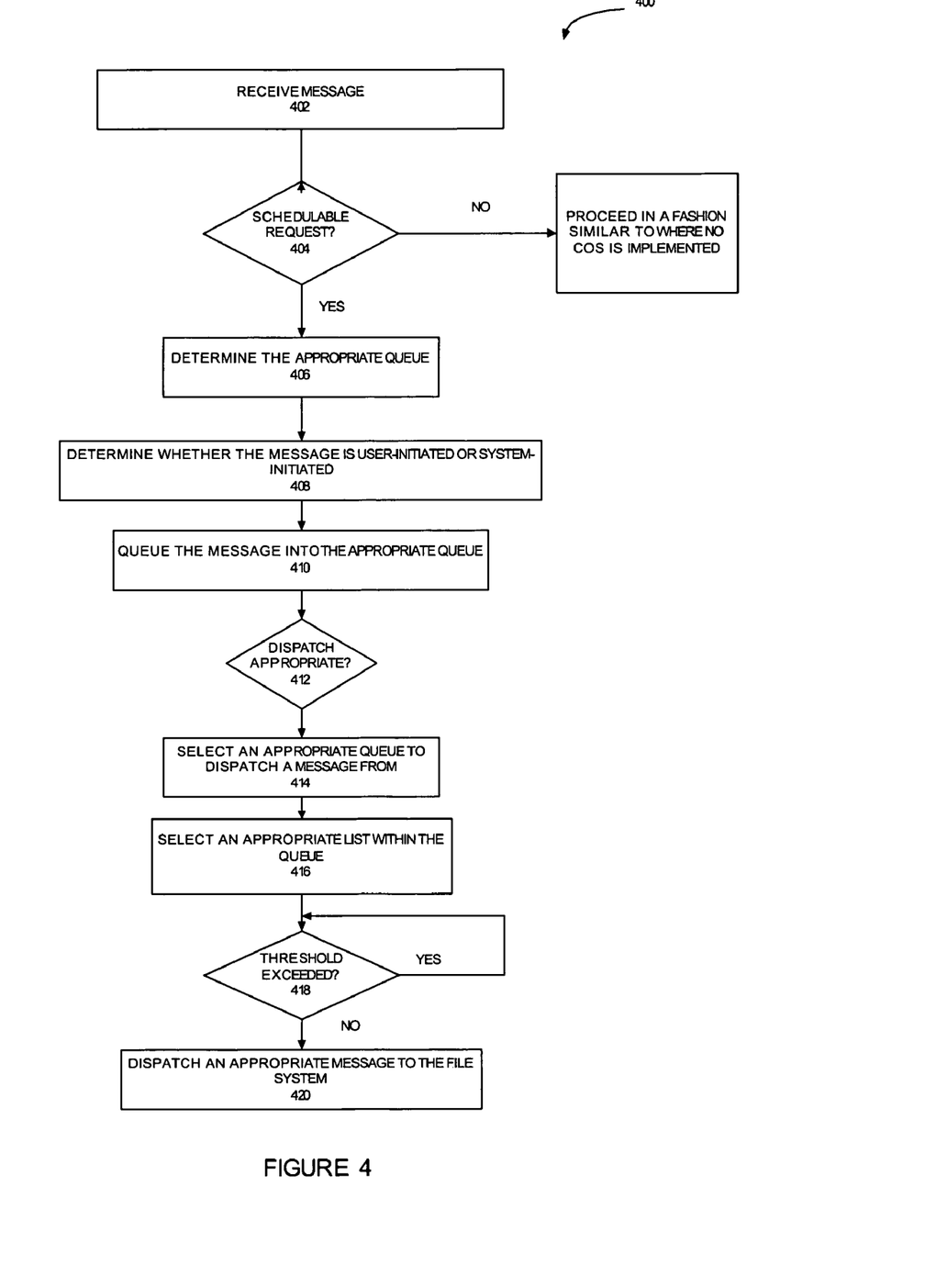
FIG. 4 is a flow chart illustrating a method to manage workload, according to one embodiment the present invention.

FIG. 4 is a flow chart illustrating a method 400 to prioritize different workload entities, according to one illustrative embodiment. The method 400 commences at operation 402, where the COS layer receives a message. At operation 404, the filter 310 determines whether the message is schedulable or non-schedulable. Non-schedulable messages are allowed to proceed in the same fashion as they would proceed without the use of the COS layer 300. At operation 406, the characterization module 320 receives schedulable messages from the filter 310 and determines the class of workload associated with the message. The message is then queued for processing at operation 410 in the priority queues 340. The appropriate queue is selected based on the class of workload. In one embodiment, the queues are sorted by the volume targeted by the message. The message is placed in the user list or the system list of the appropriate queue based on the determination performed at operation 408 of whether the message is a user-initiated message (e.g., a user request for data access) or a system-initiated message (e.g. snapmirror).

Messaged are removed from the selected queue when it is determined, at operation 412, that it is appropriate to dispatch a message. One of the priority properties for each queue is a "weight" for the queue, which designates the priority of the queue relative to other queues. The priority of the queue corresponds to the priority of the class of workload associated with the queue. At operation 414, a queue is selected based on the relative priorities of the associated classes of workload using, in one embodiment, a modified Monte Carlo random selection mechanism (e.g., using a random number generator which selects a value based on the type of statistical distribution assigned by the designer). It will be noted that other randomization mechanisms may be utilized. At operation 416, the method determines whether a user message or a system message is to be dispatched, based on the system/user weight property for the selected queue and a random number used to determine which message to dequeue. If the message is associated with user-initiated work, then the method determines whether the predetermined resource-related thresholds have been exceeded. If, for example, the maximum number of disk reads for this class of workload is present in the system already or if the maximum amount of NVRAM has already been consumed, then the work is not passed through. Otherwise, the message is passed on into (or transmitted to) the file system 280 at operation 418.

If the message is associated with system-initiated work, the method then determines, at operation 418, whether the predetermined number of outstanding system-initiated requests have been exceeded. If, for example, the maximum number of outstanding system-initiated requests have been exceeded, then the system-initiated work is not passed through (e.g., temporarily suspended). Otherwise, the message is passed on into file system 280. The message is dispatched at operation 420.

Alternatively, the processing logic may first determine the queues which have work and work credits (permitted additional outstanding requests) available then makes a random selection (e.g., utilizing modified Monte Carlo algorithm) from the previously determined queues.

Thus, a method and system to manage workload have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

It will be noted that the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

What is claimed is:

1. A method to service messages in a storage system, the method comprising:
    receiving a message at a storage server;
    determining, by the storage server, a class of the message, wherein the class of the message is associated with a priority level;
    placing the message in a queue from a plurality of queues, wherein the queue is associated with the class of the message;
    if the number of queued messages does not exceed the predetermined threshold, selecting the message for dequeuing using a randomized selection mechanism;
    if a number of queued messages in the plurality of queues exceeds a predetermined threshold, selecting the message for dequeuing using a direct selection mechanism; and
    dequeuing the selected message by sending the message to a file system for the message to be serviced.

2. The method of claim 1, wherein the message is a user-initiated message.

3. The method of claim 2, wherein the class of the message is associated with a volume targeted by the message.

4. The method of claim 3, wherein the volume is a flexible volume.

5. The method of claim 3, wherein the volume is a traditional volume.

6. The method of claim 2, wherein the class of the message is associated with a network protocol.

7. The method of claim 2, wherein the class of the message is associated with a network port.

8. The method of claim 1, wherein the priority level is with respect to maximum permitted CPU utilization for the class of the message.

9. The method of claim 1, wherein the priority level is with respect to concurrent disk reads.

10. The method of claim 1, wherein the priority level is with respect to Non-Volatile Random Access Memory (NVRAM).

11. The method of claim 1, wherein the message is a system-initiated message.

12. The method of claim 11, wherein the system-initiated message is associated with a mirror process.

13. The method of claim 11, wherein the priority level is relative to a priority level of user-initiated messages.

14. The method of claim 1, wherein the priority level is a user-designated priority level.

15. An apparatus to service messages in a storage system, the apparatus comprising:
- a processor configured to process a message received at a storage server;
- a media access module coupled with the processor, wherein the media access module is configured to receive the message;
- a control of service module coupled with the processor, wherein the control of service module includes:
- a characterization module to determine a class of the message, wherein the class of the message is associated with a priority level,
- a queue from a plurality of queues, wherein the queue is configured to queue the message based on the class of the message, and
- a scheduler to dequeue the message by sending the message to a file system for the message to be serviced, wherein the scheduler selects the message for dequeuing using a direct selection mechanism if a number of queued messages in the plurality of queues exceeds a predetermined threshold, and wherein the scheduler selects the message for dequeuing using a randomized selection mechanism if the number of queued messages does not exceed the predetermined threshold.

16. The apparatus of claim 15, wherein the class of the message is associated with a volume targeted by the message.

17. A storage system comprising:
- a file system implemented by a storage server, the file to maintain a hierarchical structure of the data stored in an array of storage devices coupled with the storage server;
- and a control of service layer, executable by a processor, configured to queue a message directed to the file system, select the message for dequeuing using a direct selection mechanism if a number of queued messages exceeds a predetermined threshold, select the message for dequeuing using a randomized selection mechanism if the number of queued messages does not exceed a predetermined threshold, and dequeue the selected message by sending the message to the file system for the request to be serviced;
- wherein the control of service layer comprises:
- a characterization module to determine the class of the message and the priority level associated with the class of the message;
- a queue to queue the message based on the class of the message;
- and a scheduler to service the message utilizing the priority level of the class of the message.

18. The storage system of claim 17 wherein the queue is from a plurality of queues, wherein each queue from the plurality of queues is associated with a different class of messages.

19. A machine-readable storage medium having stored thereon data representing sets of instructions executable by a machine, wherein the instructions configure the machine to:
- receive a message;
- determine a class of the message, wherein the class of the message is associated with a priority level;
- place the message in a queue from a plurality of queues, wherein the queue is associated with the class of the message;
- select the message for dequeuing using a direct selection mechanism if a number of queued messages in the plurality of queues exceeds a predetermined threshold;
- select the message for dequeuing using a randomized selection mechanism if the number of queued messages does not exceed the predetermined threshold; and
- dequeue the selected message by sending the message to a file system for the message to be serviced.

20. The method of claim 1, wherein the randomized selection mechanism is weighted according to the priority level using a Monte Carlo random selection algorithm.

21. The apparatus of claim 15, wherein the randomized selection mechanism is weighted according to the priority level using a Monte Carlo random selection algorithm.

* * * * *